United States Patent
Hwang et al.

(10) Patent No.: US 7,159,165 B2
(45) Date of Patent: Jan. 2, 2007

(54) OPTICAL RECORDING MEDIUM, DATA RECORDING OR REPRODUCING APPARATUS AND DATA RECORDING OR REPRODUCING METHOD USED BY THE DATA RECORDING OR REPRODUCING APPARATUS

(75) Inventors: Sung-hee Hwang, Seoul (KR); Yoon-woo Lee, Gyeonggi-do (KR); Sung-hyu Han, Seoul (KR); Sang-hyun Ryu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 10/022,826

(22) Filed: Dec. 20, 2001

(65) Prior Publication Data

US 2002/0157045 A1 Oct. 24, 2002

Related U.S. Application Data

(60) Provisional application No. 60/284,881, filed on Apr. 20, 2001.

(30) Foreign Application Priority Data

Apr. 20, 2001 (KR) ............... 2001-21520
Jul. 9, 2001 (KR) ............... 2001-40897

(51) Int. Cl.
*G11C 29/00* (2006.01)
*H03M 13/00* (2006.01)

(52) U.S. Cl. .......... 714/769; 714/763; 714/770
(58) Field of Classification Search ........ 714/769, 714/763, 770

See application file for complete search history.

(56) References Cited

U.S. PATENT DOCUMENTS

| 6,112,324 | A | 8/2000 | Howe et al. | |
|---|---|---|---|---|
| 6,158,038 | A | 12/2000 | Yamawaki et al. | |
| 6,216,245 | B1* | 4/2001 | Noda | 714/755 |
| 6,223,322 | B1* | 4/2001 | Michigami et al. | 714/769 |
| 6,539,512 | B1* | 3/2003 | Jeong et al. | 714/752 |
| 6,718,510 | B1* | 4/2004 | Kojima | 714/784 |

FOREIGN PATENT DOCUMENTS

| JP | 9-293331 | 11/1997 |
|---|---|---|
| JP | 2001-101806 | 4/2001 |
| WO | WO 00/7300 | 2/2000 |

* cited by examiner

*Primary Examiner*—Joseph D Torres
(74) *Attorney, Agent, or Firm*—Stein, McEwen & Bui, LLP (57) ABSTRACT

An optical recording medium, a data recording or reproducing apparatus, and a data recording or reproducing method used by the data recording or reproducing apparatus. In a method of recording data on an optical disc, each of a plurality of error correction code (ECC) blocks is divided into a plurality of partitions. Next, data from the partitions is interleaved so that each of the ECC blocks is alternately and equally selected to generate a recording block. The generated recording block is modulated and recorded on an optical disc. As a result, the optical recording medium, the data recording apparatus, and the data recording method used by the apparatus are compatible with the format of a conventional digital versatile disc (DVD) and have higher error correction rates. In a reproducing method, the recording block is deinterleaved.

13 Claims, 10 Drawing Sheets

OPTICAL RECORDING MEDIUM, DATA RECORDING OR REPRODUCING APPARATUS AND DATA RECORDING OR REPRODUCING METHOD USED BY THE DATA RECORDING OR REPRODUCING APPARATUS

CROSS-REFERENCE TO RELATED APPLICATIONS

This application claims the benefit of Korean Application Nos. 2001-21520, filed Apr. 20, 2001 and 2001-40897, filed Jul. 9, 2001, in the Korean Industrial Property Office, the disclosures of which are incorporated herein by reference. This application also claims the benefit of U.S. Provisional Application No. 60/284,881, filed on Apr. 20, 2001.

BACKGROUND OF THE INVENTION

1. Field of the Invention

The present invention relates to an error correction method and apparatus thereof, and more particularly, to an optical recording medium, a data recording or reproducing apparatus, and a data recording or reproducing method used by the data recording or reproducing apparatus, which are capable of recording high density data.

2. Description of the Related Art

Digital broadcasting is achieving common use throughout the world. However, current digital versatile discs (DVDs) have a capacity of 4.7–10 gigabytes, and thus a two-hour movie (about 25 gigabytes) received via digital broadcasting cannot be recorded on a DVD disc. As a result, a high density recording medium to record a digital broadcast having the size of a movie is required.

A method to increase recording density is to reduce the size of a laser beam used in recording/reading data. The smaller the radius of the laser beam, the more densely information tracks on which data is recorded can be formed, thereby increasing recording density. However, if only the radius of the laser beam is decreased, the quantity of the light used in recording/reading data is also reduced, thereby increasing the effect of damage or dust on the surface of the disc. That is, an error generation rate when recording/reading data is increased.

SUMMARY OF THE INVENTION

Accordingly, it is an object of the present invention to provide an optical recording medium, a data recording apparatus, and a data recording method used by the data recording apparatus, which have higher error correction rates when recording/reading data.

It is another object of the present invention to provide an optical recording medium, a data recording apparatus, and a data recording method used by the data recording apparatus, which are compatible with the format of a conventional digital versatile disc (DVD) and have higher error correction rates.

Additional objects and advantages of the invention will be set forth in part in the description which follows and, in part, will be obvious from the description, or may be learned by practice of the invention.

The foregoing objects of the present invention are achieved by providing a method to record data on an optical disc. The method includes (a) dividing each of a plurality of error correction code (ECC) blocks into a plurality of partitions, and (b) interleaving data from the partitions so that each of the ECC blocks is alternately and equally selected to generate a recording block.

The method further includes (c) rearranging the generated recording block to generate a new recording block, and the generated recording block is rearranged on a sector basis to generate the new recording block. Still further, the method includes (d) modulating the generated recording block, and (e) recording the modulated recording block.

The dividing (a) includes (a11) dividing each of the ECC blocks in a column direction by a predetermined number of bytes into object blocks, and (a12) dividing each of the object blocks in at least one direction of a row direction and the column direction by the predetermined number of bytes to generate the plurality of partitions. The interleaving (b) is performed with the same algorithm in all units of the object blocks.

The dividing (a) also includes (a21) obtaining a common divisor d for N1 and N2 when the size of the ECC blocks is N1×N2 bytes, (a22) dividing each of the ECC blocks into units of d bytes in the column direction to generate a number N2/d of object blocks, and (a23) dividing each of the object blocks generated by the dividing (a22) into d portions in the column and row directions to generate d×d partitions.

The foregoing objects of the present invention are also achieved by providing a method to record data on an optical disc. The method includes (a) dividing each of two error correction code (ECC) blocks in row and column directions to generate a plurality of partitions, and (b) interleaving data from the partitions so that each of the ECC blocks is alternately and equally selected to generate a recording block.

The data of the partitions is interleaved such that 2×N2 row-code words are included in the block obtained after interleaving the data, and the ECC blocks have row-code words (N1, k1), and column-code words (N2, k2), and the block including 2×N2 row-code words is converted to generate a recording block which includes a main data region of 2×(N2−k2) bytes and an outer parity region of 2×k2 bytes, wherein N1 and N2 indicate lengths of the row and column code words, respectively, and k1 and k2 indicate the numbers of parities, respectively.

The foregoing objects of the present invention are also achieved by providing an apparatus to record data on an optical disc. The apparatus includes an error correction code (ECC) encoder to generate a plurality of ECC blocks in which main data is recorded, and an interleaver including a partitioning portion to divide each of the generated ECC blocks by a first unit in a row direction and by a second unit in a column direction to generate a plurality of partitions, a data extracting portion to alternately extract data of the partitions from each of the ECC blocks, and a recording block generating portion to interleave the extracted data and generate a recording block. The apparatus further includes a modulating part to modulate the generated recording block, and a recording part to record the modulated recording block.

The partitioning portion divides each of the ECC blocks in the column direction by a predetermined number of bytes and divides each of the ECC blocks in the row direction by the predetermined number of bytes to generate a plurality of partitions, and the recording block generating portion sequentially interleaves the extracted data to generate a recording block, and the partitioning portion obtains a common divisor d for N1 and N2 wherein the size of the ECC blocks is N1×N2 bytes, and then divides each of the ECC blocks by a unit of d bytes in the column direction to generate a plurality of object blocks, and then divides each of the object blocks into a number d of portions in the column and row directions to generate d×d partitions.

The foregoing objects of the present invention are also achieved by providing an apparatus to record data on an optical disc. The apparatus includes an error correction code (ECC) encoder to generate two error correction code ECC blocks, and an interleaver to divide each of the two generated ECC blocks by a first unit in a row direction and by a second unit in a column direction to generate a plurality of partitions, alternately extract data of the plurality of partitions from each of the ECC blocks, and interleave the extracted data and to generate a recording block. The apparatus further includes a modulating part to modulate the generated recording block, and a recording part to record the modulated recording block.

The interleaver divides each of the ECC blocks in the column direction by a predetermined number of bytes to generate a plurality of object blocks and divides each of the object blocks in the column and row directions by the predetermined number of bytes to generate a plurality of partitions. The interleaver also obtains a common divisor d for N1 and N2 when the size of the ECC blocks is N1×N2 bytes, and then divides each of the ECC blocks by a unit of d bytes in the column direction to generate a plurality of object blocks, and then divides each of the object blocks into d portions in the column and row directions to generate d×d partitions. The data of the partitions is interleaved such that 2×N2 row-code words are included in the block obtained after interleaving the data, and the ECC encoder generates the ECC blocks having row-code words (N1, k1), and column-code words (N2, k2), and the interleaver converts a block including 2×N2 row-code words to generate a recording block which includes a main data region of 2×(N2−k2) bytes and an outer parity region of 2×k2 bytes.

The foregoing objects of the present invention are also achieved by providing an optical recording medium containing data included in one or more recording blocks. Here, the data from partitions of a plurality of ECC blocks is interleaved in the recording blocks. Particularly, the data from the partitions is interleaved so that each of the ECC blocks is alternately and equally selected.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1A:
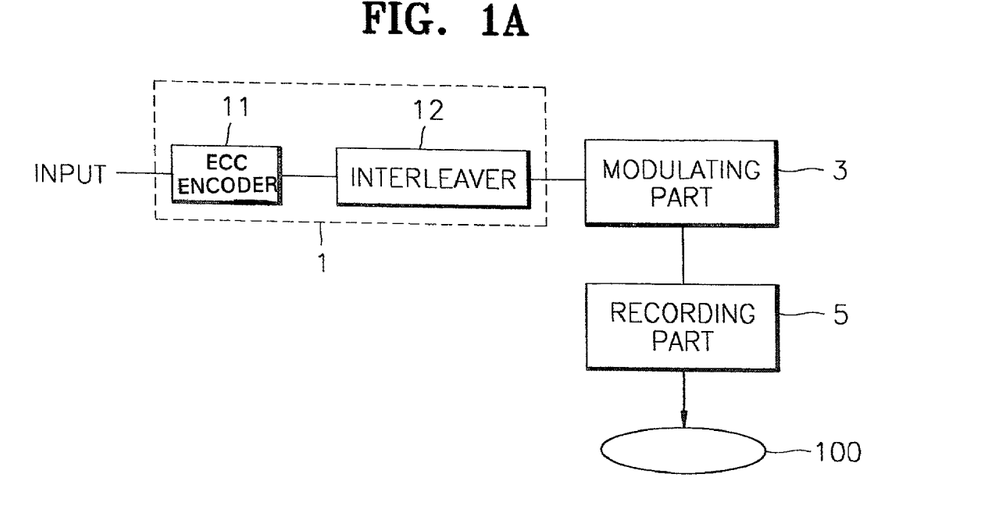
FIGS. 1A and 1B are block diagrams of a data recording apparatus according to the present invention.
Figure 1B:
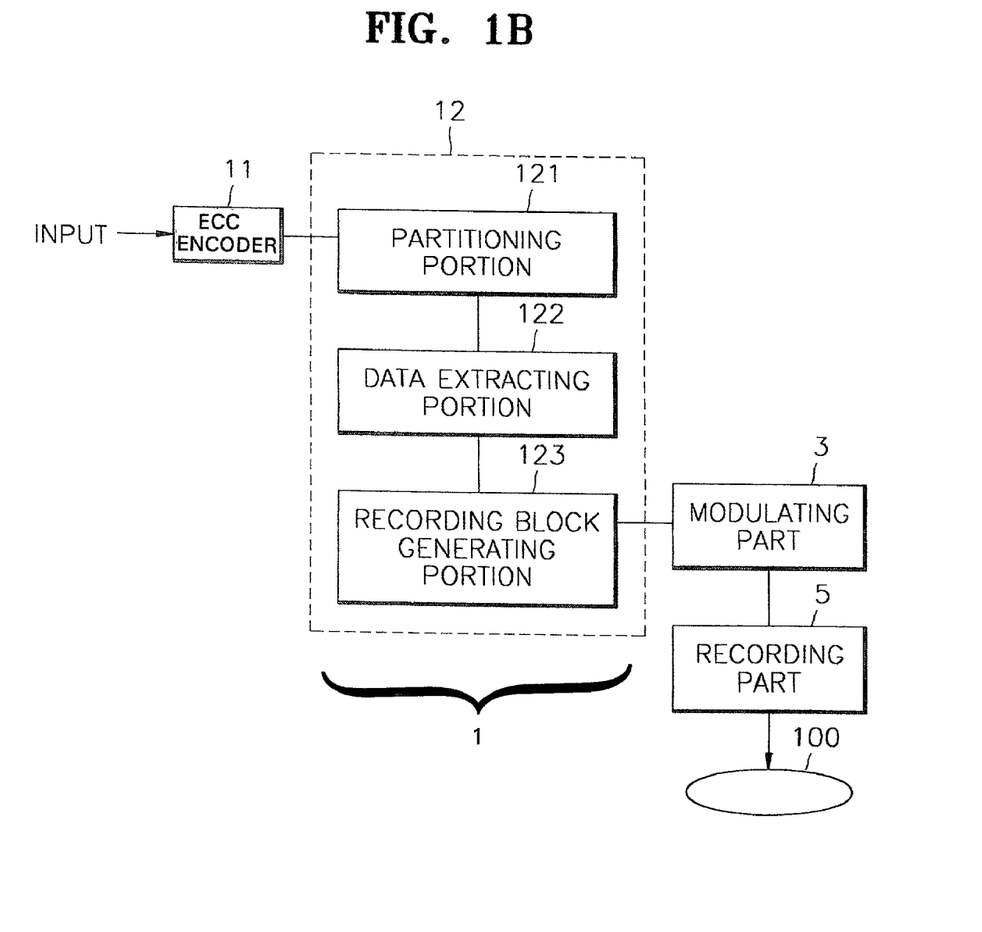

FIGS. 1A and 1B are block diagrams of a data recording apparatus according to an embodiment of the present invention. Referring to FIGS. 1A and 1B, the data recording apparatus includes an error correction code (ECC) encoding part 1, a modulating part 3, and a recording part 5. The ECC encoding part 1 includes an ECC encoder 11 and an interleaver 12. The interleaver 12 includes a partitioning portion 121, a data extracting portion 122, and a recording block generating portion 123.

The ECC encoder 11 encodes main data with an error correction code (ECC) to generate an ECC block. The interleaver 12 interleaves the ECC-encoded main data according to the present invention and generates a recording block. Interleaving is a method of distributing main data in ECC blocks on an optical disc. This method increases error correction efficiency, and can even correct a burst error.

In order to perform interleaving, the partitioning portion 121 divides each of the generated ECC blocks in a row direction and a column direction to generate a plurality of partitions. The data extracting portion 122 alternately extracts the data of the partitions from each of the ECC blocks so that each of the ECC blocks is alternately and equally selected. For example, a number N of ECC blocks may be selected in the order of 1, 2, 3, . . . , N−1, N. The recording block generating portion 123 interleaves the extracted data to generate a recording block. A more specific interleaving method will be described later.

The modulating part 3 modulates the recording block generated by the ECC encoding part 1 according to a predetermined modulating method. The modulating method used in this embodiment is eight to fourteen modulation plus (EFM+), that is, a method to modulate each byte of the recording block data into a 16 bit code word. The recording part 5 records the modulated recording block on an optical disc 100. When recording the modulated recording block on the optical disc 100, a channel bit pulse stream is recorded. A modulated bit stream is converted into the channel bit pulse stream by non return to zero inversion (NRZI) coding. Here, various converting methods to record the channel bit pulse stream can also be used.

Figure 2A:
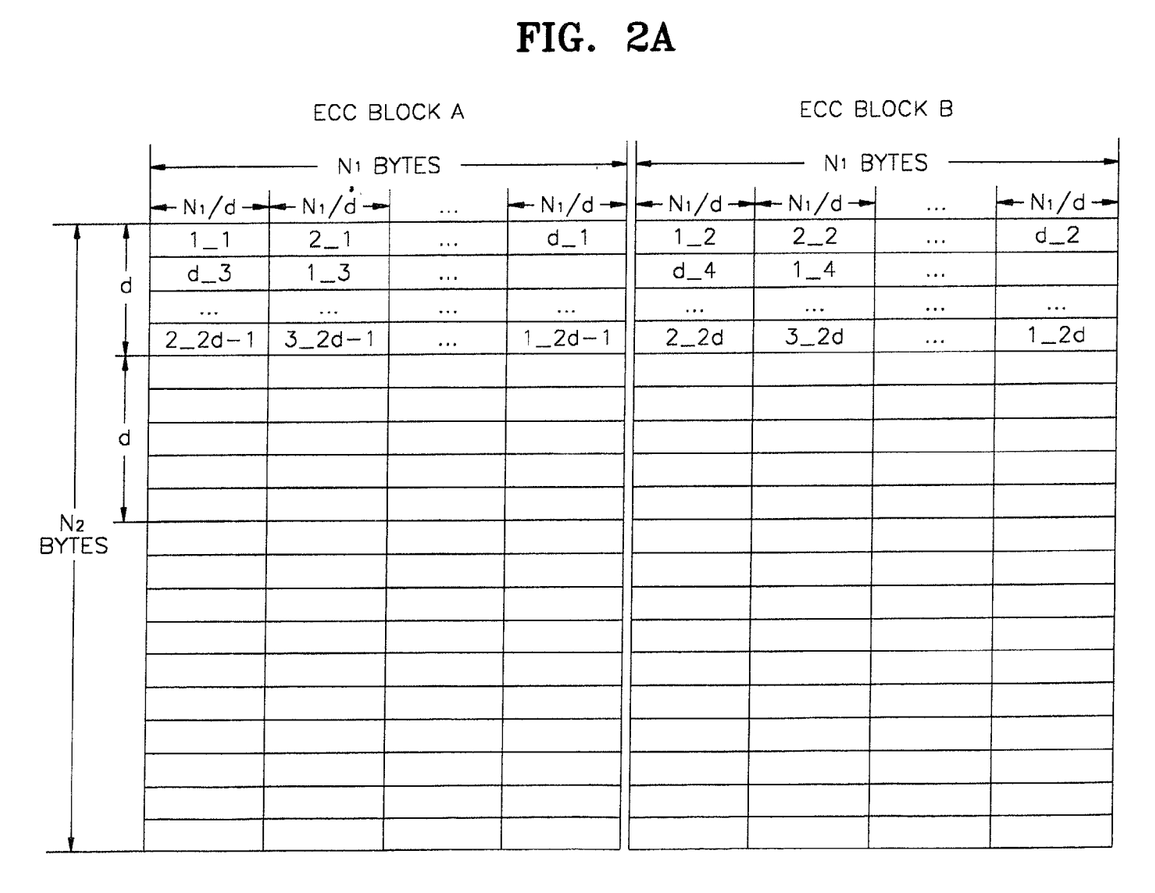
FIGS. 2A and 2B illustrate the format of error correction code (ECC) blocks which are interleaved according to the present invention.
Figure 2B:
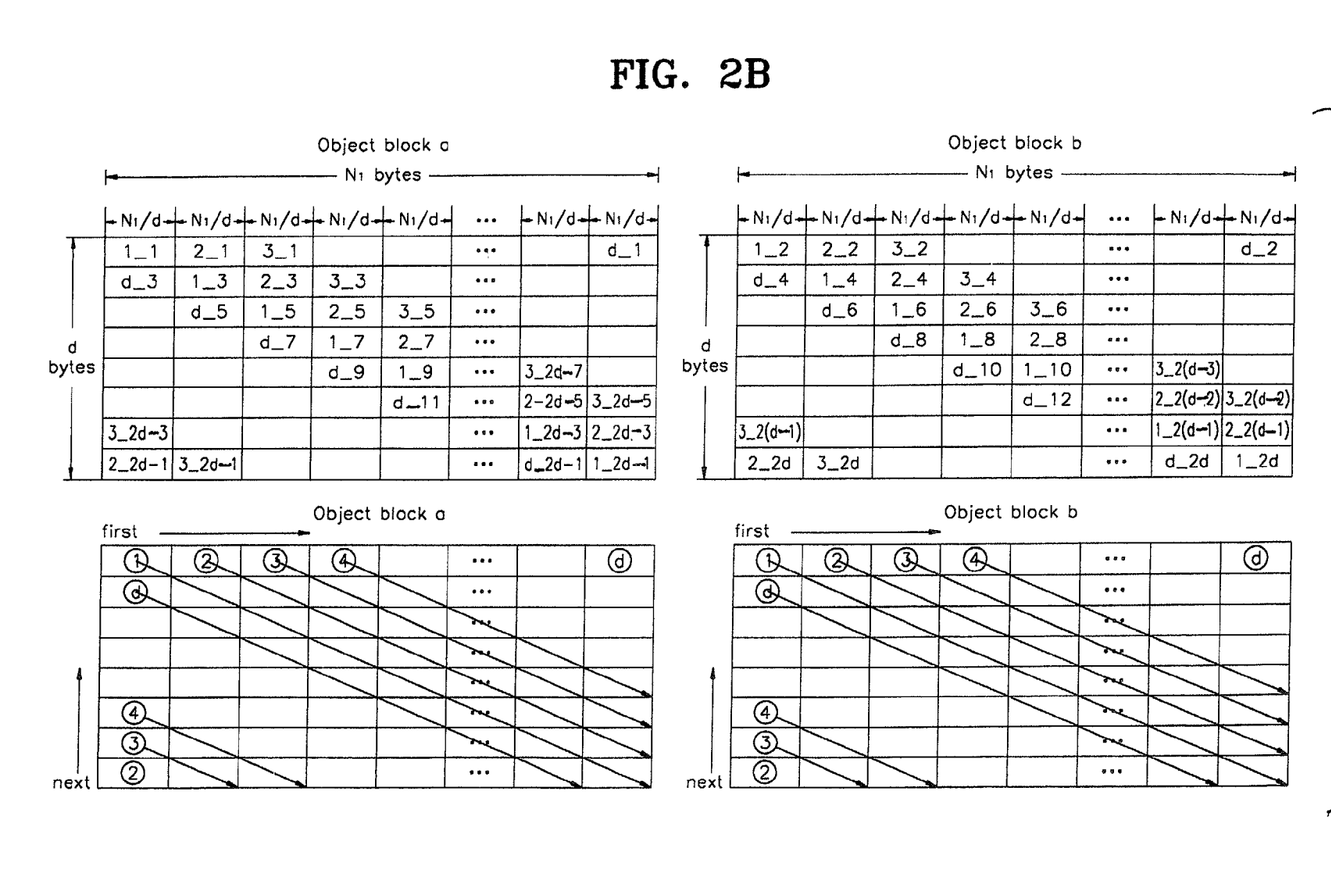

FIGS. 2A and 2B illustrate the format of ECC blocks which are interleaved according to the present invention. Referring to FIG. 2A, each of ECC blocks A and B comprises N1 bytes of data in a row direction, and N2 bytes of data in a column direction. Row-code words comprising main data and an inner parity are arranged in a row direction. Here, a predetermined number of row-code words comprise one sector. Therefore, at least one sector is arranged in a column direction, and row-code words having an identifier ID are included in each sector.

The row-code words can be obtained by Reed-Solomon Product coding. That is, each row is an RS(N1, m, p) code.

Here, N1 is the total size of the code words, m is the size of the main data, and p is the number of parity bits plus one bit. Since Reed-Solomon Product coding is good at correcting multi-errors and is used in digital versatile discs (DVD), Reed-Solomon Product coding is selected for compatibility with DVDs. However, the coding method used can be changed when needed. Similarly, the size of the ECC blocks and the number of bytes allocated to the parity can be changed. The identifier ID and a parity for error detection EDC are included in each sector. The address of the main data included in the corresponding sector is recorded in the identifier ID. Thus, the main data can be searched by the identifier ID.

Interleaving to generate a recording block according to the present invention is performed as follows. As shown in FIG. 2A, first, each of the ECC blocks A and B is divided by a unit of d rows in a column direction. Here, d is a common divisor for N1 and N2. Blocks which are obtained by dividing by a unit of d rows in a column direction are referred to as object blocks shown in FIG. 2B. Interleaving according to this embodiment of the present invention is repeatedly performed by a unit of two object blocks a and b (shown in FIG. 2B), which belong to the ECC blocks A and B, respectively.

Referring to FIG. 2B, the object blocks a and b are divided into units of 1 byte in the column direction and are divided into units of d bytes in the row direction. As a result, each of the object blocks a and b is divided into d×d partitions, giving a total of 2×d×d partitions between objects blocks a and b. Following along lines 1–4, which are diagonals, and line d in the lower portion of FIG. 2B, these partitions are 1_1, 1_2, . . . , 1_2×d, 2_1, 2_2, . . . , 2_2×d, . . . , d_2, . . . , and d_2×d.

There are N1/d bytes of data in the partitions such as 1_1, 1_2, . . . , 1_2×d, 2_1, 2_2, . . . , 2_2×d, . . . , d_1, d_2, . . . , and d_2×d, which are finally obtained.

Next, data is extracted from the partitions in numerical order. That is, first, data is extracted from the partition 1_1, second, from the partition 1_2, . . . , and $(2 \times d)^{th}$, from the partition 1_2×d. Again, $(2 \times d+1)^{th}$, data is extracted from the partition 1_1, and $(2 \times d+2)^{th}$, from the partition 1_2, . . . , and $(2 \times d+2 \times d)^{th}$, from the partition 1_2×d. In this order, all data is extracted from the partitions 1_1, 1_2, . . . , 1_2×d, and then, data is alternately extracted from the partitions 2_1, 2_2, . . . , 2_2×d. The above procedure is performed repeatedly in units of object blocks. The recording block generated as a result of performing the above procedure is shown in FIG. 3.

Figure 3:
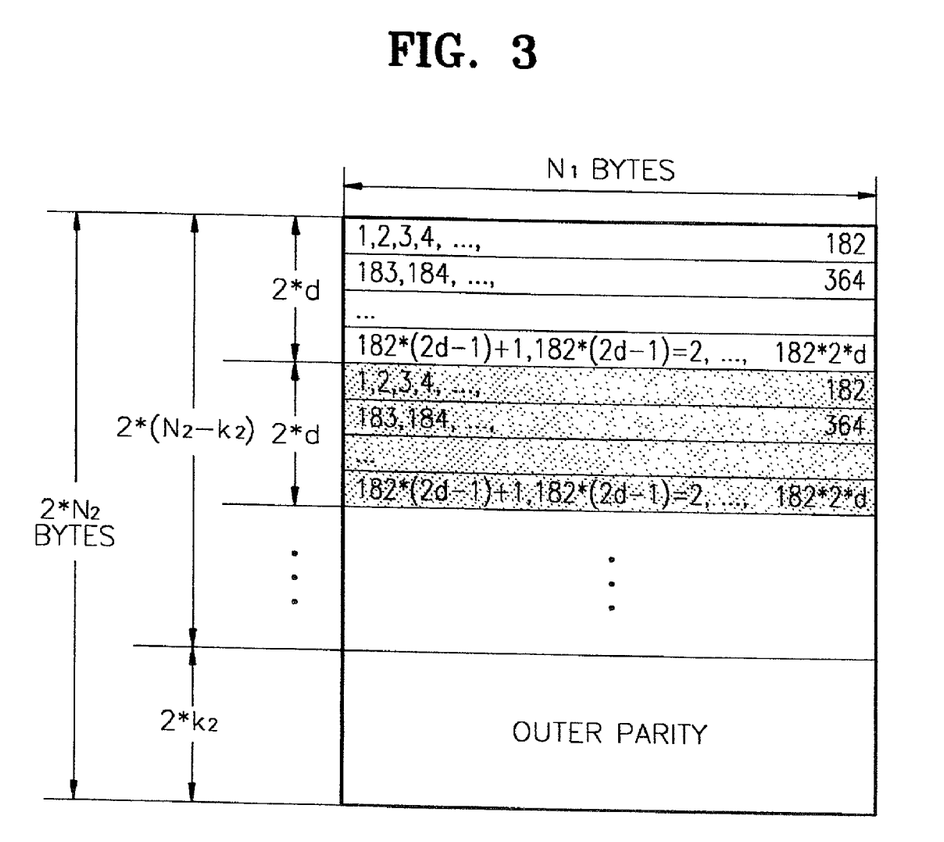
FIG. 3 illustrates the format of a block generated by the interleaving of FIG. 2.

Referring to FIG. 3, the recording block generated according to FIGS. 2A and 2B is comprised of main data of a 2×(N2−k2) row size and an outer parity of a 2×k2 row size. The numbers recorded in the row direction of the recording block represent serial numbers which are allocated to bytes of data existing in each of the partitions. That is, if interleaving is performed, as described with reference to FIGS. 2A and 2B, bytes of data is arranged in the order shown in FIG. 3. The generated block can be rearranged on the basis of a sector of 2 KB.

Meanwhile, for simplification, a method to number serial numbers of the object blocks a and b will now be described. Since there are N1/d bytes of data in each of the partitions of the object blocks a and b, the following serial numbers are allocated to each of the partitions of the object blocks a and b.

Partition 1_1: N1/d of numbers having 1 as a remainder divided by 2×d among numbers 1_2×N1, are sequentially arranged.

Partition 1_2: N1/d of numbers having 2 as a remainder divided by 2×d among numbers of 1_2×N1, are sequentially arranged.

Partition 1_2×d: N1/d of numbers having 0 as a remainder divided by 2×d among numbers 1_2×N1, are sequentially arranged.

Partition 2_1: N1/d of numbers having 1 as a remainder divided by 2×d among numbers 2×N1+1_2×N1+2×N1, are sequentially arranged.

Partition 2_2: N1/d of numbers having 2 as a remainder divided by 2×d among numbers 2×N1+1_2×N1+2×N1, are sequentially arranged.

Partition 2_2×d: N1/d of numbers having 0 as a remainder divided by 2×d among numbers 2×N1+1_2×N1+2×N1, are sequentially arranged.

Partition d_1: N1/d of numbers having 1 as a remainder divided by 2×d among numbers (d−1)×2×N1+1_$_{d\times}$2×N1, are sequentially arranged.

Partition d_2: N1/d of numbers having 2 as a remainder divided by 2×d among numbers (d−1)×2×N1+1_d×2×N1, are sequentially arranged.

Partition d_2×d: N1/d of numbers having 0 as a remainder divided by 2×d among numbers (d−1)×2×N1+1_d×2×N1, are sequentially arranged.

This is generalized as follows:

m_n: N1/d of numbers having n as a remainder divided by 2×d among numbers (m−1)×2×N1+1_m×2×N1, are sequentially arranged.

Figure 4:
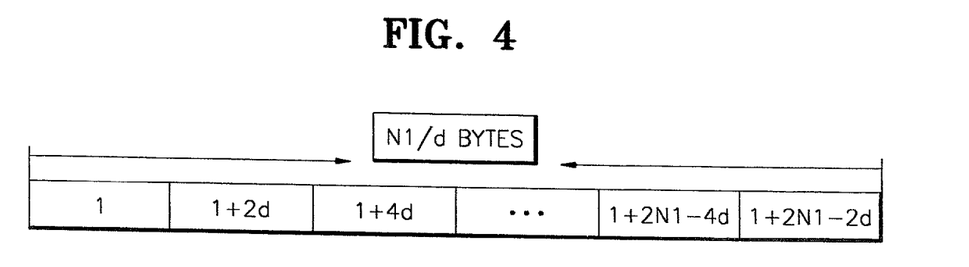
FIG. 4 illustrates numbers which are allocated to N1/d bytes of data belonging to a partition 1_1 of the object block a of FIG. 2B.

Referring to FIG. 4, for example, numbers such as 1, 1+2d, 1+4d, . . . , 1+2N1−4d, and 1+2N1−2d, are sequentially allocated to N1/d bytes of data belonging to the partition 1_1. That is, there are N1/d bytes of data in the partition 1_1, 1 is allocated to a first byte of the N1/d bytes of data, 1+2d to a second byte of the N1/d bytes of data, 1+4d to a third byte of the N1/d bytes of data, . . . , 1+2N1−4d to a $\{(N1/d)-1\}^{th}$ byte of the N1/d bytes of data, and 2N1−2d to a $(N1/d)^{th}$ byte of the N1/d bytes of data.

Figure 5:
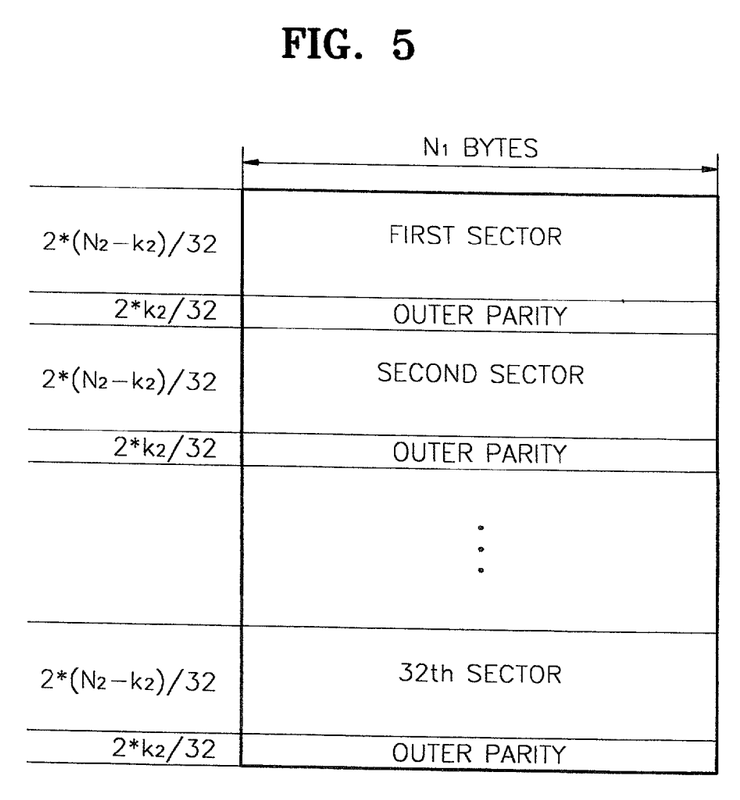
FIG. 5 illustrates a recording block rearranged on the basis of the block of FIG. 3.

FIG. 5 illustrates a recording block rearranged on the basis of the block of FIG. 3. Referring to FIG. 5, 2×(N2−k2)/32 rows are extracted from the block of FIG. 3, and arranged, and 2×k2/32 rows are extracted from the outer parity and arranged, thereby forming one sector. The number of sectors generated by the above procedure totals 32. 32 sectors are formed because one error correction code (ECC) block in DVDs is comprised of 16 sectors, thus, there is DVD compatibility. The range of a burst error correction which can be corrected by Reed-Solomon Product codes in conventional DVDs is 16 rows×182 bytes+10 bytes, that is, 2,922 bytes.

Figure 6:
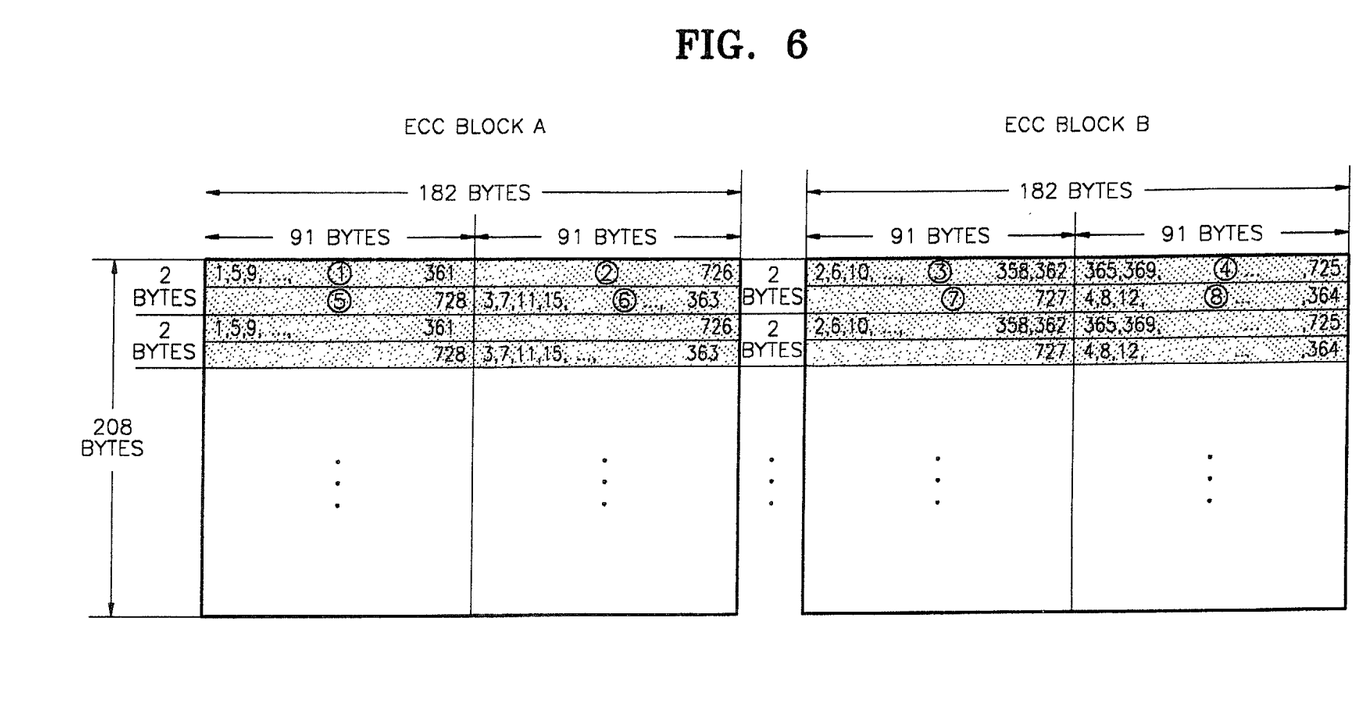
FIG. 6 is an example of the ECC blocks A and B of FIGS. 2A and 2B.

FIG. 6 is an example of the ECC blocks A and B in which N1=182 bytes, N2=208 bytes, and d=2. In this case, the recording block according to the present invention is generated by interleaving, as described below.

First, each of the ECC blocks A and B is divided into object blocks in a unit of 2 rows in a row direction. As a result, a total of eight partitions such as ①, ②, ③, ④, ⑤, ⑥, ⑦, and ⑧, exist in the object blocks a and b. Next, first data is extracted from the partition ①, second data is extracted from the partition ③, third data is extracted from the partition ⑥, and fourth data is extracted from the partition ⑧. Then, fifth data is extracted from the partition ①, sixth data is extracted from the partition ③, seventh data is extracted from the partition ⑥, and eighth data is extracted from the partition ⑧. Thus, as shown in FIG. 2B and FIG. 6, the progression through the partitions is on a diagonal line. In this way, after extracting all data from the partitions ①, ③, ⑥, and ⑧, data is alternately extracted from the partitions ②, ④, ⑤, and ⑦. The above procedure is performed repeatedly in a unit of 2 rows. The recording block generated as a result of performing the above procedure is shown in FIG. 7.

Figure 7:
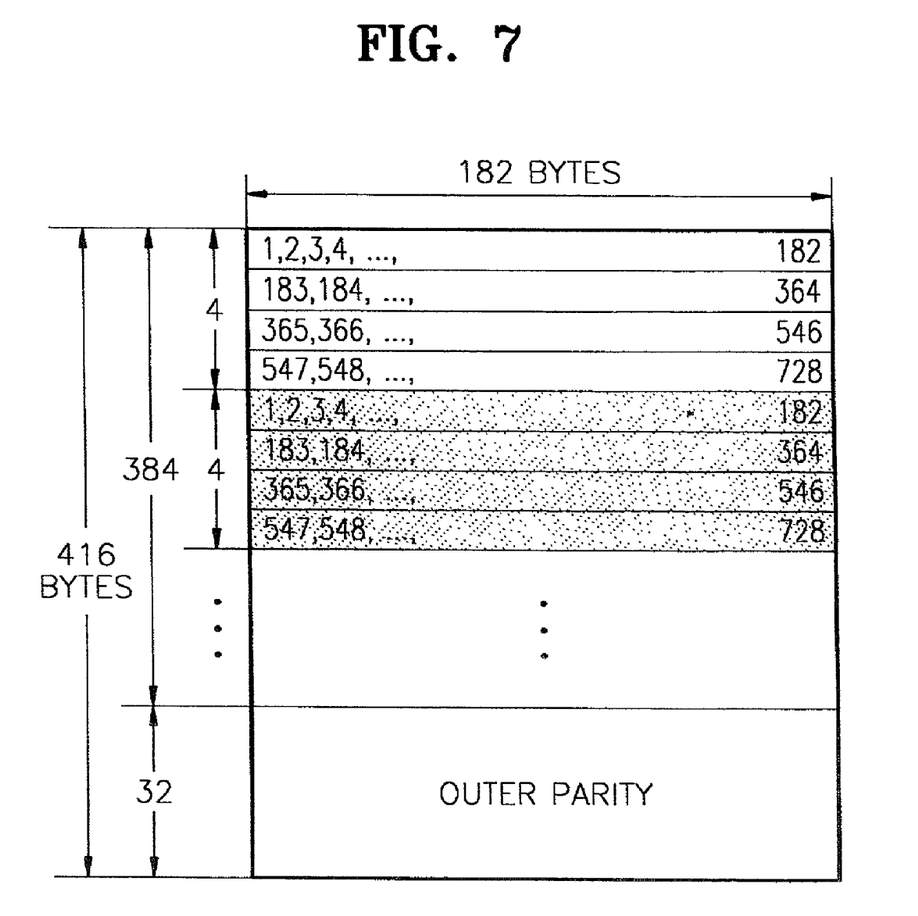
FIG. 7 illustrates the format of the block generated by the interleaving of FIG. 5.

Referring to FIG. 7, the recording block generated according to FIG. 6 is comprised of 384 rows of data and an outer parity of 32 rows. Numbers shown in FIG. 7 represent serial numbers which are allocated to bytes of data, as described with reference to FIGS. 3 and 4. The generated recording block can then be rearranged on a sector basis.

Figure 8:
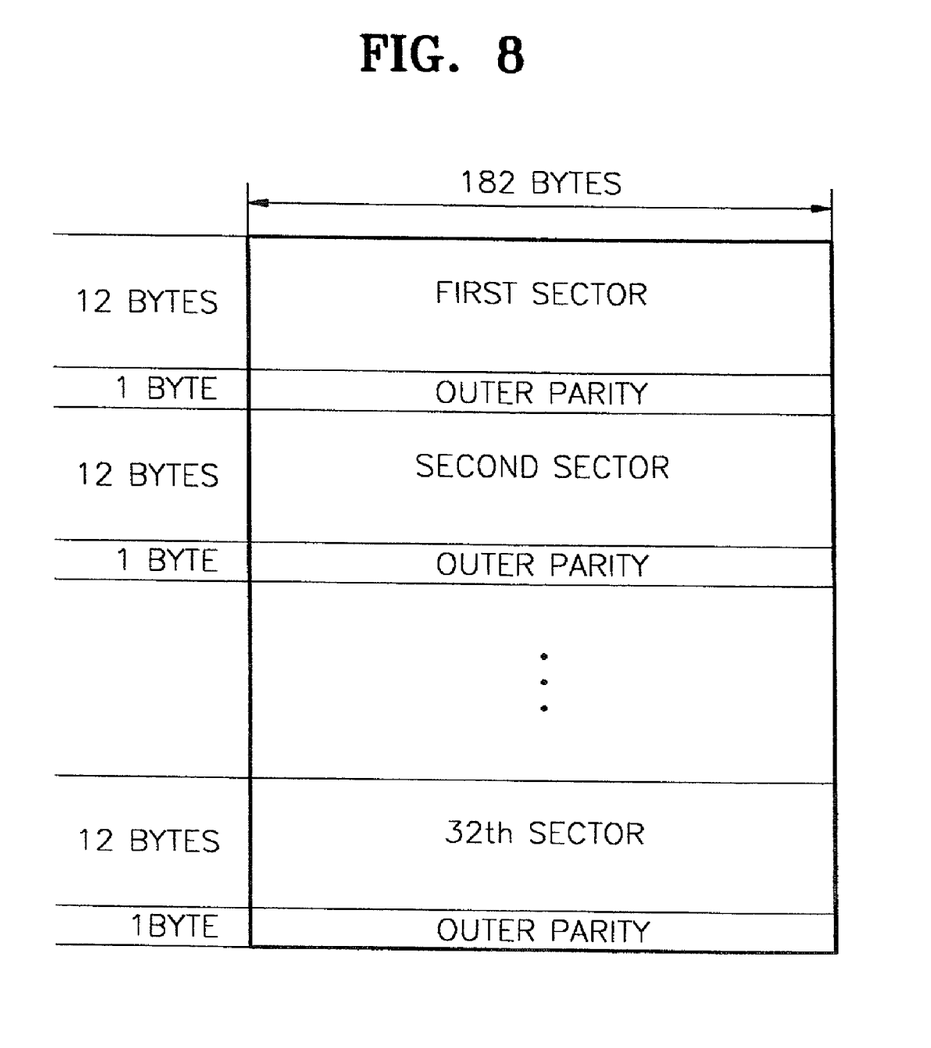
FIG. 8 illustrates a recording block rearranged on the basis of the blocks of FIG. 6.

FIG. 8 illustrates a recording block rearranged on the basis of the block of FIG. 7. Referring to FIG. 8, 12 rows are extracted from a main data region included in the block of FIG. 7 and arranged, and 1 row is extracted from the outer parity region and arranged, thereby forming one sector. The number of sectors generated by the above procedure is 32 in total. Since one error correction code (ECC) block in the DVD is comprised of 16 sectors, there is compatibility with DVDs.

Figure 9:
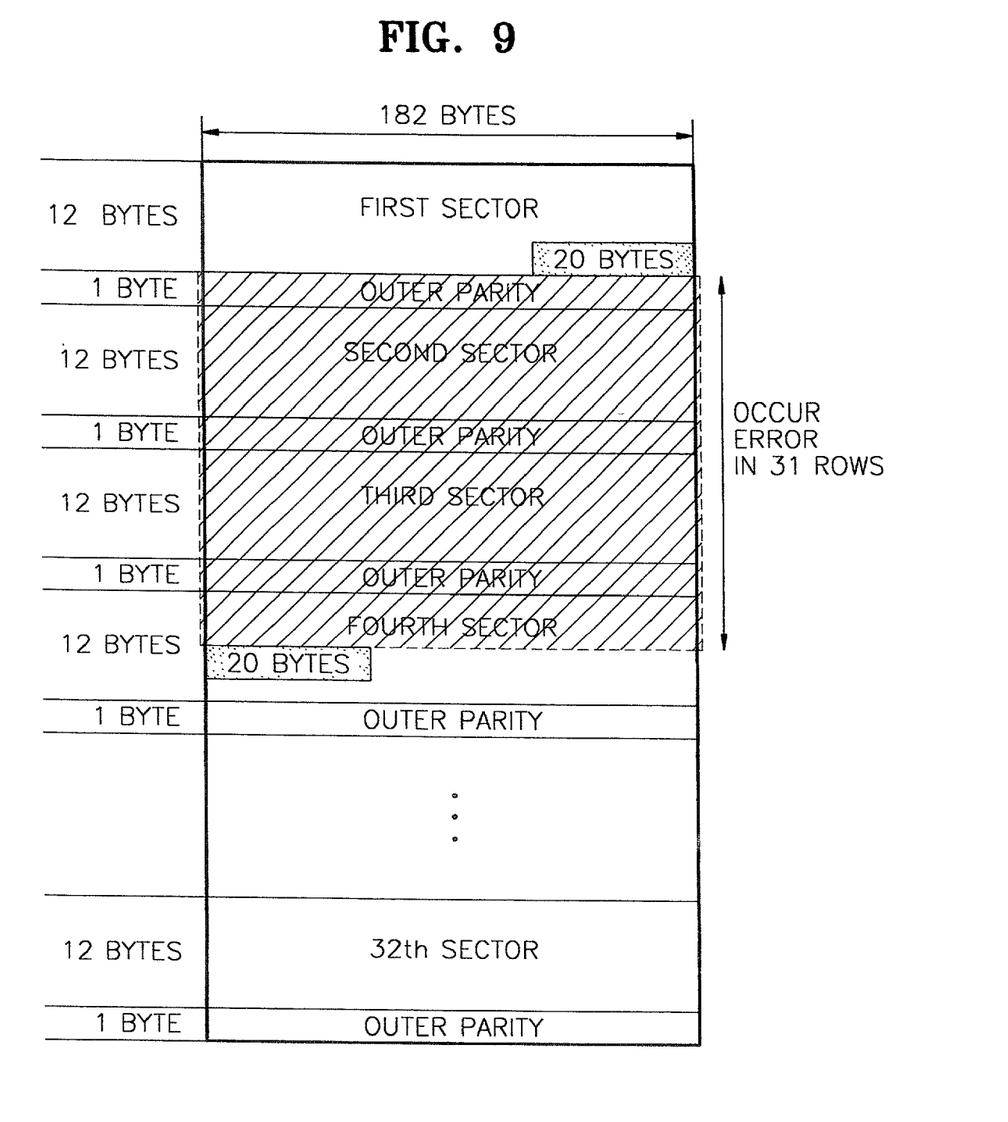
FIG. 9 illustrates the largest error that can be corrected by error correction according to the present invention.

FIG. 9 illustrates the largest error that can be corrected by error correction according to the present invention. For example, the largest error that can be corrected by error correction used in RS(182, 172, 11)×RS(208, 192, 17) is decided as below. Referring to FIG. 9, in a first case, errors occur in 31 consecutive rows and errors of 20 bytes occur in both the beginning and end of the 31 consecutive rows, totaling an error of 40 bytes, an outer parity of 3 rows of the errors is converted into an error of 2 rows in the recording block obtained by interleaving according to the present invention, and the main data of 28 rows of the errors is converted into an error of 14 rows in the recording block obtained by interleaving. Thus, in total, a code of 16 rows can be corrected by the outer parity. Also, since the error of 20 bytes occurring at the beginning of the 31 rows results in an error of 2 rows, each row comprising an error of 5 bytes in each of the recording blocks a and b, the error of 20 bytes can be corrected by the inner parity. Also, the error of 20 bytes occurring at the end of the 31 rows results in an error of 2 rows, each row comprising an error of 5 bytes in each of the recording blocks a and b, and thus can also be corrected by the inner parity. Thus, in total, 182 bytes×31+ 40 bytes=5, 682 bytes are corrected.

In this way, according to this embodiment of the present invention, interleaving with blocks is performed using two conventional ECC blocks, and interleaving with code words in each block is performed to generate the recording block. As a result, the burst error is distributed into two regions, and the correction ability of the inner parity by interleaving with code words is quadrupled.

Although the above method of interleaving was described with respect to two blocks, this method can be applied to greater than two ECC blocks. That is, a common divisor between the more than two ECC blocks is obtained, and then, each ECC block is divided into a plurality of partitions on the basis of the row of the obtained common divisor. Next, a part of the data, which is included in the divided plurality of partitions, is extracted from the partitions, thereby interleaving the data. The extraction of the data is performed so that each ECC block is alternately and equally selected. The recording block obtained by interleaving can then be consecutively recorded or can then be rearranged on a sector basis.

Figure 10A:
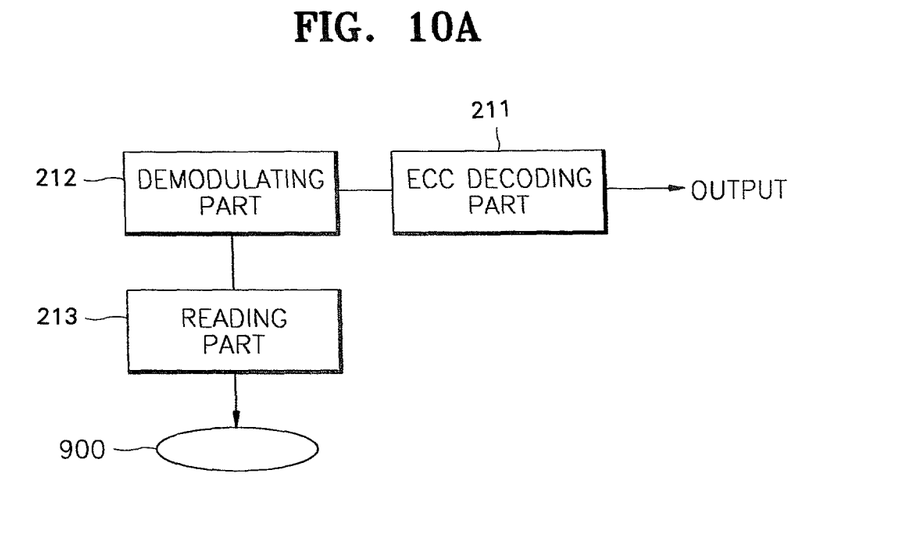
FIGS. 10A and 10B are block diagrams of a data reproducing apparatus according to an embodiment of the present invention.
Figure 10B:
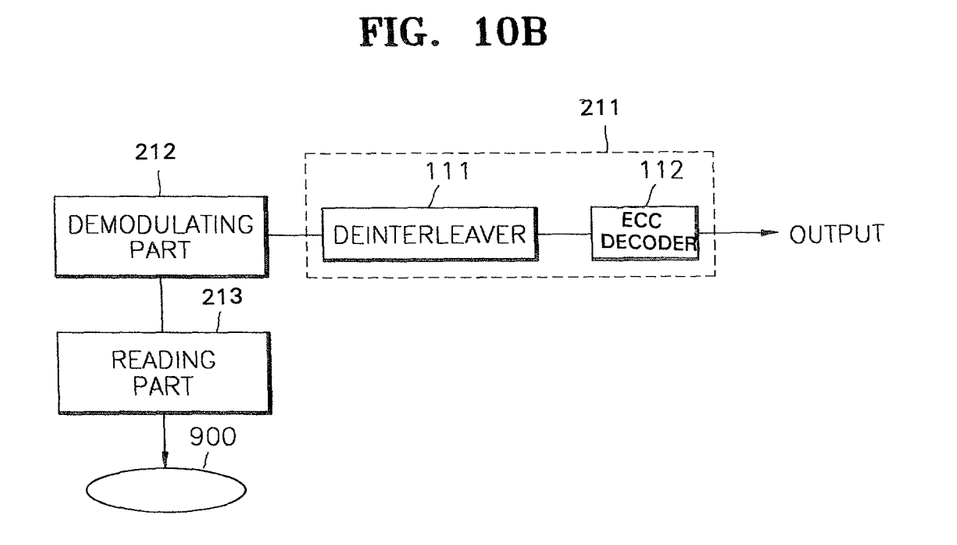

FIGS. 10A and 10B are block diagrams of a data reproducing apparatus according to the present invention. Referring to FIG. 10A, the data reproducing apparatus includes a reading part 213, a demodulating part 212, and an ECC decoding part 211. The reading part 213 reads data from an optical disc 900 on which data is recorded. The demodulating part 212 demodulates the read data. The demodulating method used depends on the modulating method.

The ECC decoding part 211 ECC-decodes the demodulated data, that is, a recording block. More specifically, referring to FIG. 10B, the ECC decoding part 211 includes a deinterleaver 111 and an ECC decoder 112. The deinterleaver 111 deinterleaves the recording block in the order reverse to the interleaver 12 of FIG. 1B to generate a plurality of ECC blocks. The ECC decoder 112 decodes the demodulated data into main data with an ECC, which is used in the generated ECC block, and outputs the main data.

As described above, according to the present invention, the optical recording medium, the data recording or reproducing apparatus, and the data recording or reproducing method used by the recording or reproducing apparatus, are compatible with the format of a conventional digital versatile disc (DVD) and have higher error correction rates.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of recording data on an optical disc, the method comprising:
encoding input data with an error correction code (ECC) to generate ECC encoded data in a plurality of ECC blocks, each ECC block having a predetermined size of rows and columns;
dividing each of the ECC blocks of the ECC encoded data further in row and column directions to form a plurality of partitions, each partition having a predetermined unit in row and column directions;
interleaving data from the plurality of the partitions by alternately extracting data from the partitions of each of the ECC blocks so that partitions from each of the ECC blocks are alternately selected such that progression through the partitions of each ECC block occurs diagonally to generate a first recording block;
modulating the first recording block; and
recording the modulated first recording block on the optical disc,
wherein the dividing of the ECC blocks comprises dividing each of the ECC blocks in a column direction by a predetermined number of bytes into object blocks; and dividing each of the object blocks in row and column directions by the predetermined number of bytes to generate the plurality of partitions such that each of the object blocks has a same number of units in both the row direction and the column direction.

2. The method as claimed in claim 1, further comprising rearranging the first recording block to generate a second recording block.

3. The method as claimed in claim 2, wherein the first recording block is rearranged on a sector basis to generate the second recording block.

4. The method as claimed in claim 1, wherein all of the data from the plurality of partitions are interleaved using a same algorithm.

5. The method as claimed in claim 1, wherein the interleaving the data comprises interleaving a predetermined number of bytes of the data from each ECC block to generate the first recording block.

6. The method as claimed in claim 1, wherein the dividing of the ECC blocks includes:

obtaining a common divisor d for N1 and N2 wherein the predetermined size of the ECC blocks is N1×N2 bytes where N1 and N2 are positive integers;

dividing each of the ECC blocks into units of d bytes in a column direction to generate N2/d object blocks; and dividing each of the object blocks into d portions in the column direction and a row direction to generate d×d of the partitions.

7. The method as claimed in claim 1, wherein a burst error is corrected by the interleaving the data.

8. A method of recording/reproducing data comprising:

generating a plurality of error correction code (ECC) blocks of encoded data each of the ECC blocks having a predetermined size in row and column directions;

dividing each of the ECC blocks of the encoded data further in row and column directions to form a plurality of partitions, each partition having a predetermined unit in row and column directions;

alternately extracting data from the partitions from each of the ECC blocks so that each of the ECC blocks is alternately and equally selected along diagonal paths;

generating a recording block based on extracted data from the partitions;

modulating the recording block; and recording the modulated recording block on a medium, wherein the dividing of the ECC blocks comprises dividing each of the ECC blocks in a column direction by a predetermined number of bytes into object blocks; and dividing each of the object blocks in row and column directions by the predetermined number of bytes to generate the plurality of partitions such that each of the object blocks has a same number of units in both the row direction and the column direction.

9. The method as claimed in claim 8, wherein the interleaving of the data further comprises selecting an equal amount of the data from the partitions of each of the ECC blocks.

10. The method as claimed in claim 8, further comprising encoding input data with an error correction code (ECC) to generate ECC encoded data in the plurality of ECC blocks.

11. The method as claimed in claim 8, wherein the interleaving of the data comprises interleaving a predetermined number of bytes of data from each ECC block to generate the recording block.

12. The method as claimed in claim 11, further comprising:

reading the modulated recording block from the medium;

demodulating the modulated recording block; and deinterleaving the demodulated recording block in an order reverse to the interleaving of extracted data from the partitions prior to recording on the medium.

13. The method as claimed in claim 8, wherein the data size of each ECC block is N1×N2 bytes, where N1 and N2 are positive integers, d is a common divisor of N1 and N2, and the dividing of the ECC blocks into the object blocks comprises dividing each of the ECC blocks by d bytes in the column direction to generate N2/d object blocks.

* * * * *